Aug. 4, 1964   C. R. GOLLNICK   3,143,230
REFUSE VEHICLE
Filed May 9, 1960   9 Sheets-Sheet 1
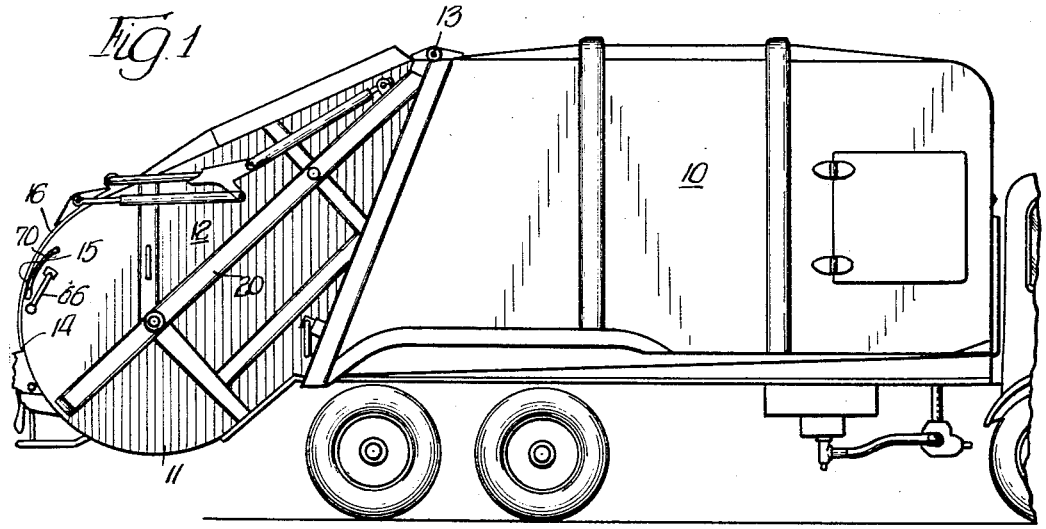
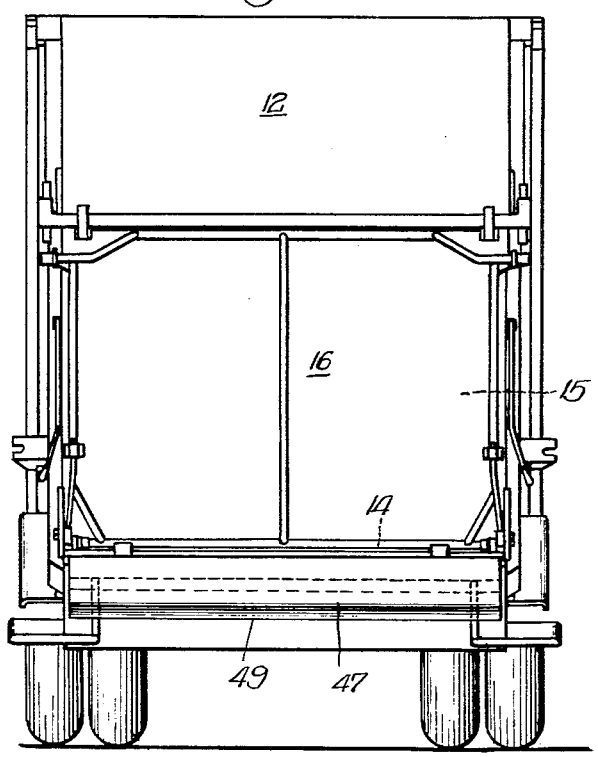
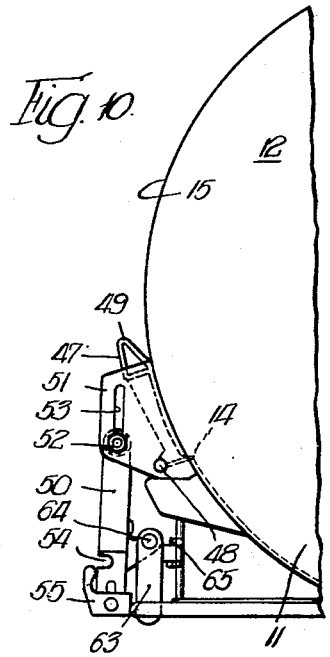
INVENTOR.
Cyril R. Gollnick,
BY
Cromwell, Greist & Warden
ATTYS.

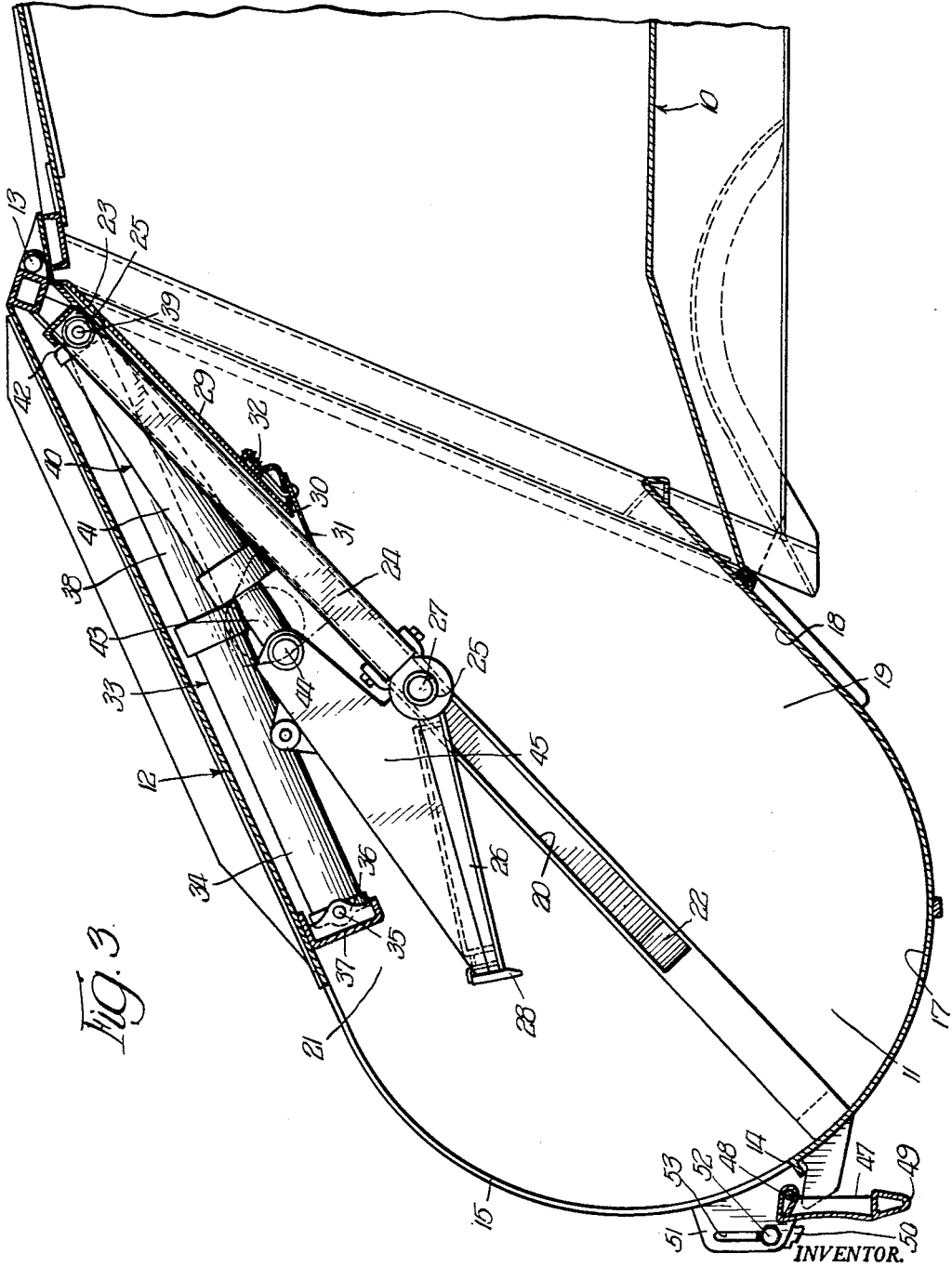

Aug. 4, 1964 C. R. GOLLNICK 3,143,230
REFUSE VEHICLE
Filed May 9, 1960 9 Sheets-Sheet 3
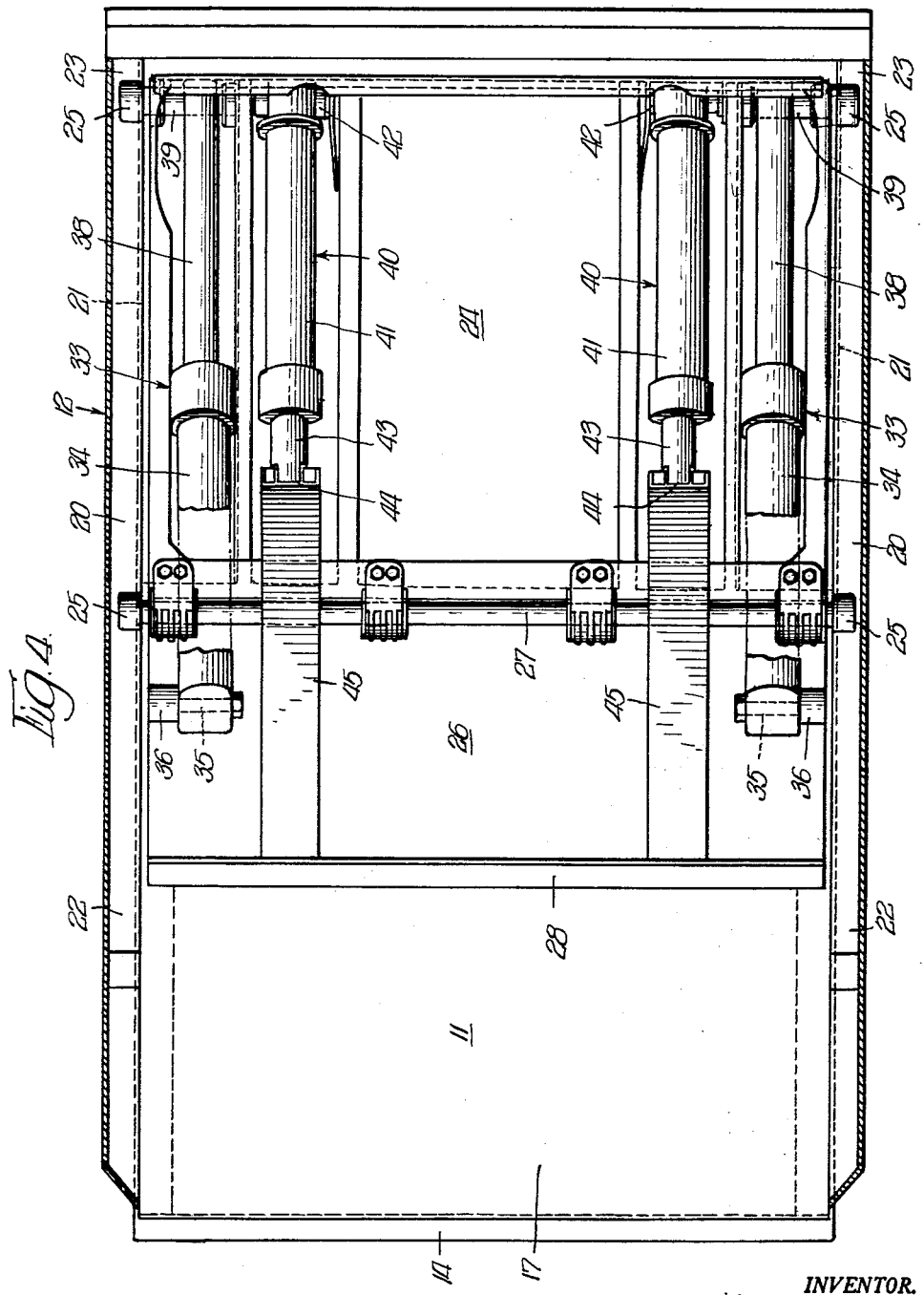
INVENTOR.
Cyril R. Gollnick,
BY
Cromwell, Greist + Warden
Attys

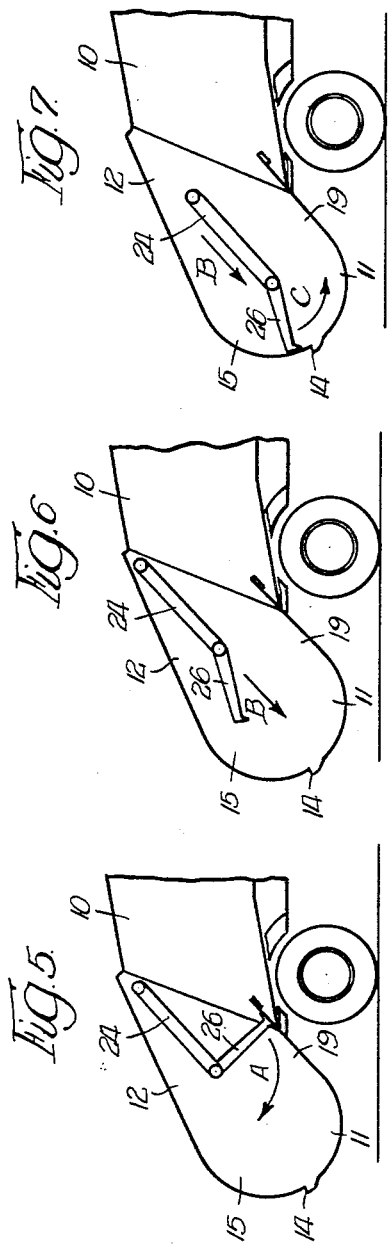

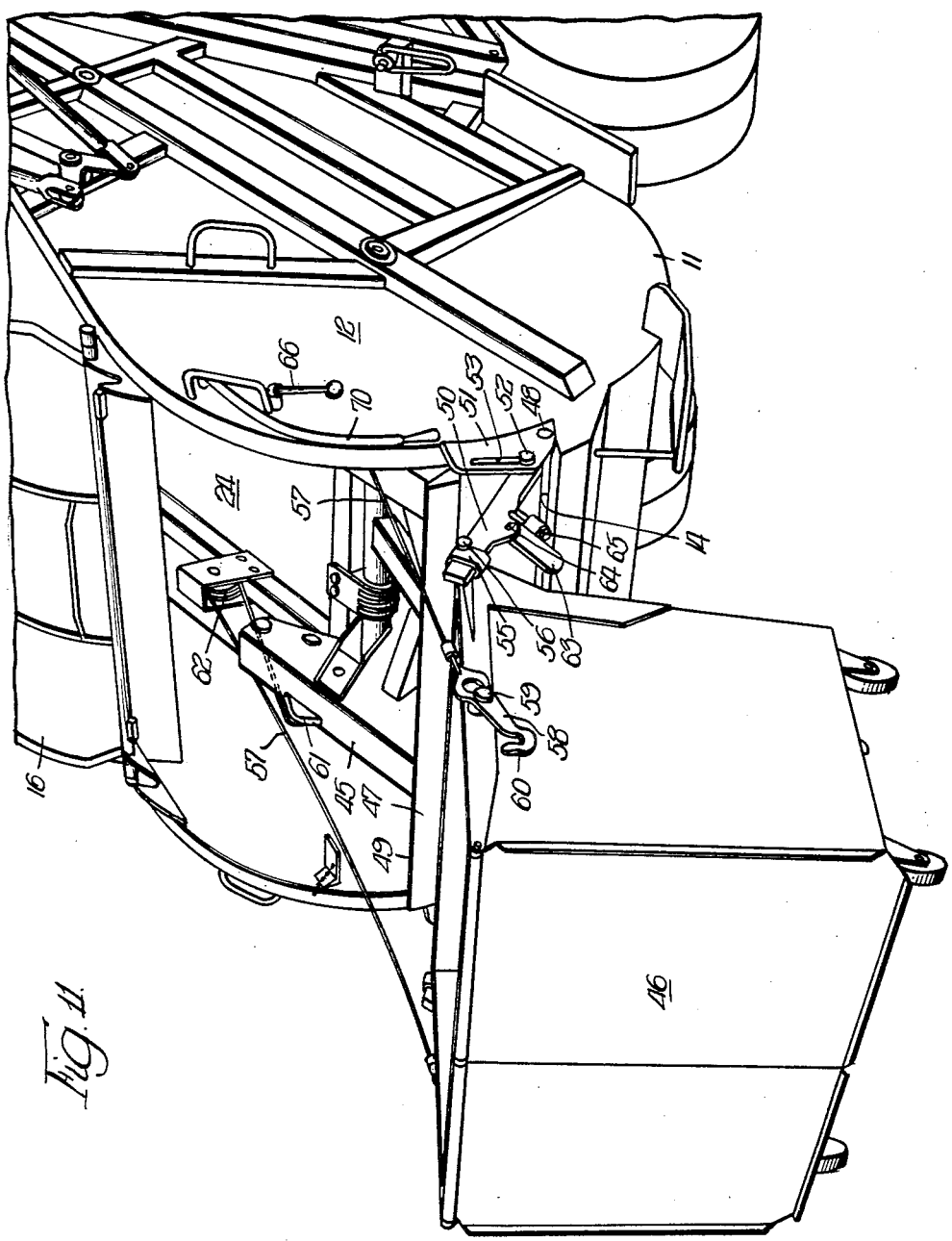

Aug. 4, 1964  C. R. GOLLNICK  3,143,230
REFUSE VEHICLE
Filed May 9, 1960  9 Sheets-Sheet 6
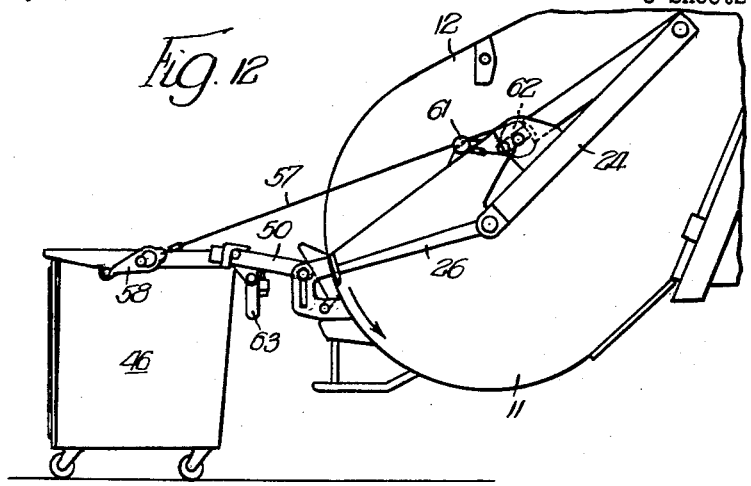
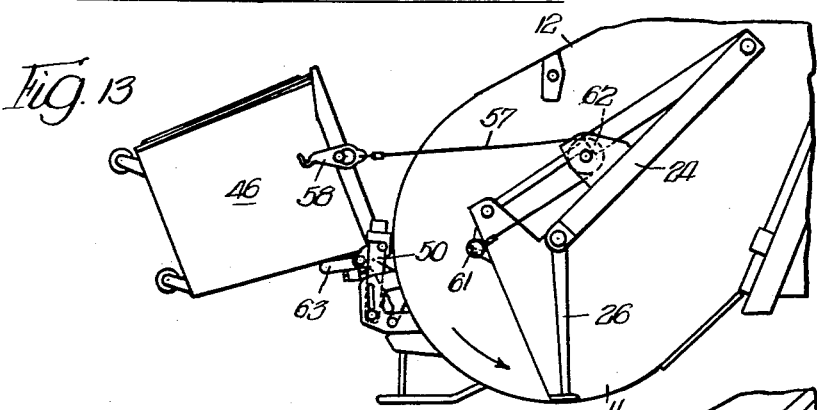
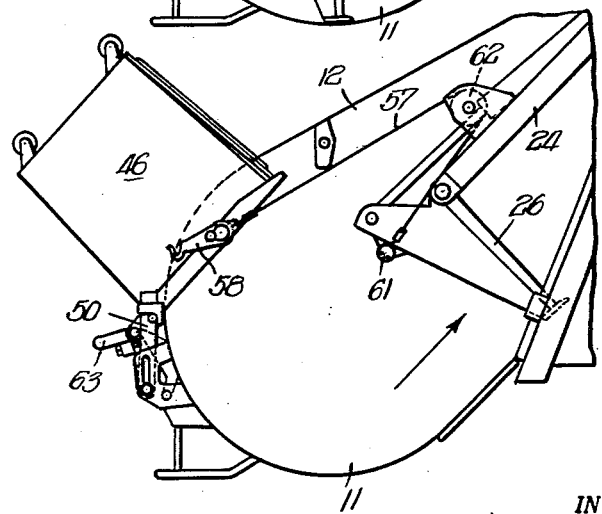
INVENTOR.
Cyril R. Gollnick.
BY Cromwell, Greist & Warden
ATTYS.

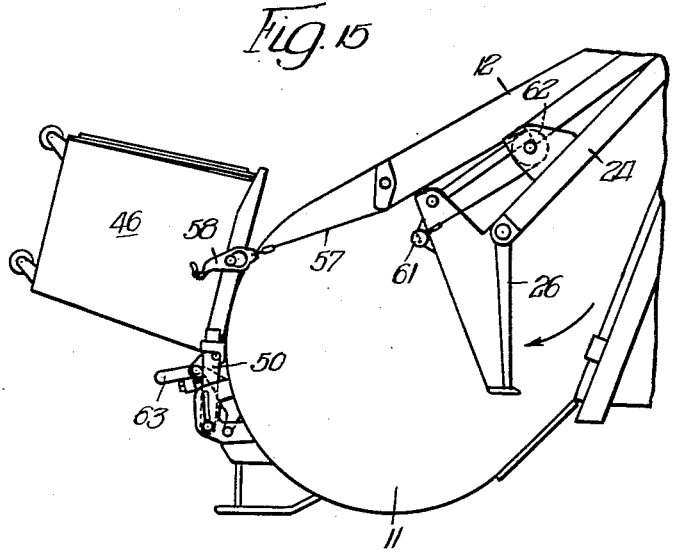
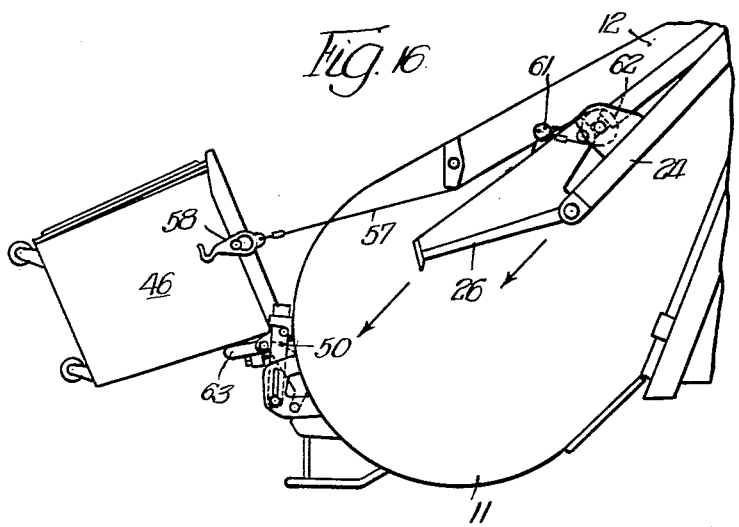

Aug. 4, 1964   C. R. GOLLNICK   3,143,230
REFUSE VEHICLE

Filed May 9, 1960   9 Sheets-Sheet 8

INVENTOR.
Cyril R. Gollnick,
BY
Cromwell, Greist + Warden
Attys

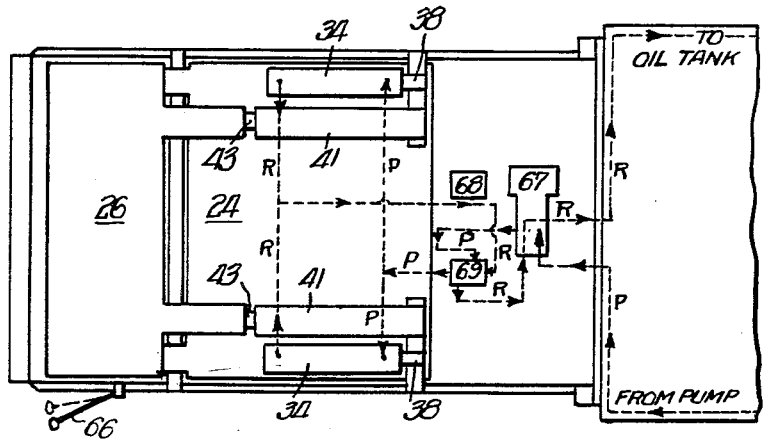
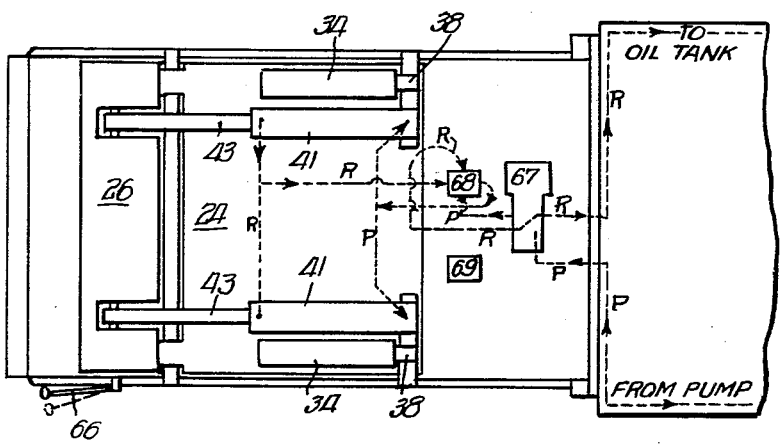
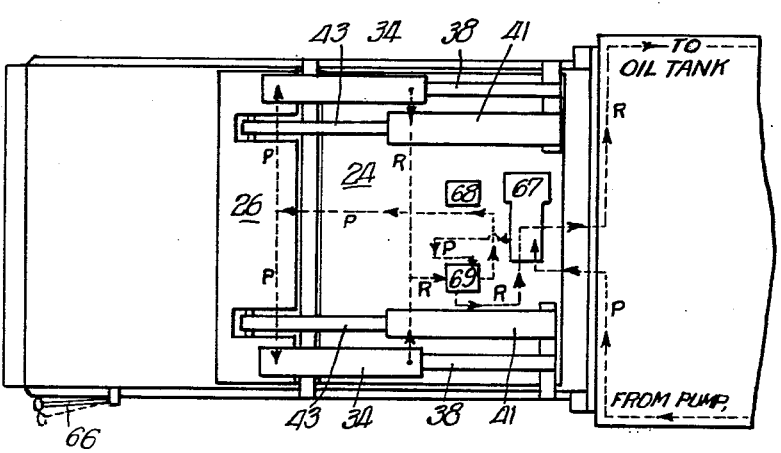

United States Patent Office 3,143,230
Patented Aug. 4, 1964

3,143,230
REFUSE VEHICLE
Cyril R. Gollnick, Oshkosh, Wis., assignor to Leach Company, Oshkosh, Wis., a corporation of Wisconsin
Filed May 9, 1960, Ser. No. 27,905
9 Claims. (Cl. 214—302)

This invention has to do with large capacity vehicles of the type used for the collection, compaction and transportation of refuse, garbage and the like.

The principal object of the invention is to provide, in a vehicle of this type, new and improved means for transferring the refuse from the receiving hopper into the storage body and for compacting the refuse within the body.

Another object of the invention is to provide, in association with a vehicle of this type, new and improved means for handling the dumping of the refuse into the receiving hopper from separate mobile containers.

While the foregoing statements are indicative of the nature of the invention other objects and advantages will be apparent upon an understanding of the construction, arrangement and operation of the vehicle.

One embodiment of the invention is presented herein by way of illustration but it will be understood that the invention is capable of being incorporated in other structurally modified forms coming equally within the spirit of the invention and the scope of the appended claims.

In the accompanying drawings:

FIG. 1 is a side view of a refuse vehicle constructed in accordance with the invention;

FIG. 2 is a rear end view of the vehicle, with the charging door lowered into its closed position;

FIG. 3 is a vertical longitudinal section through the tail gate portion of the vehicle, showing the carrier plate and the packer plate and the hydraulic cylinders used in operating those plates.

FIG. 4 is a section through the tail gate portion, taken on an inclined plane above but parallel to the side tracks along which the carrier plate runs;

Figure 18:
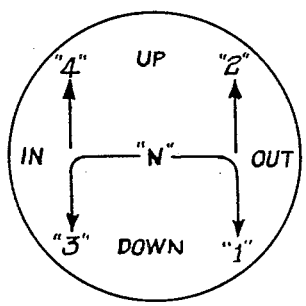
Figure 17:
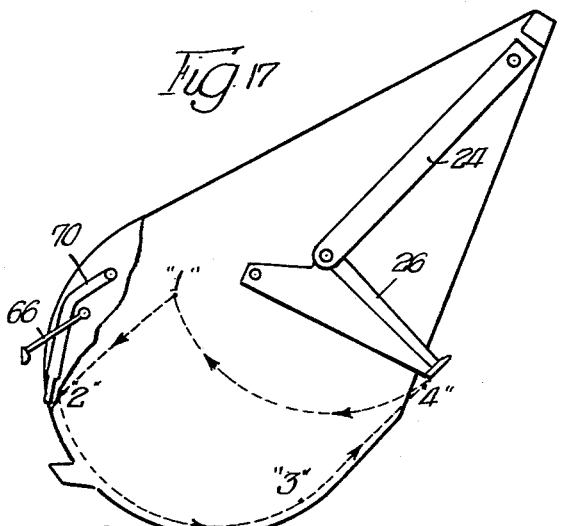
Figure 19:
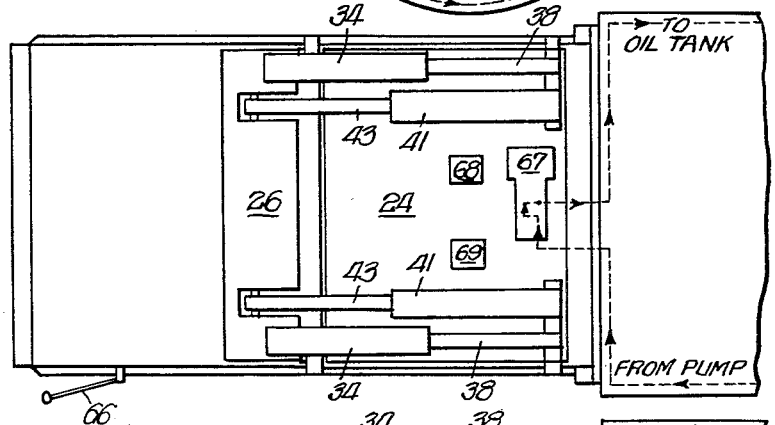
Figure 20:
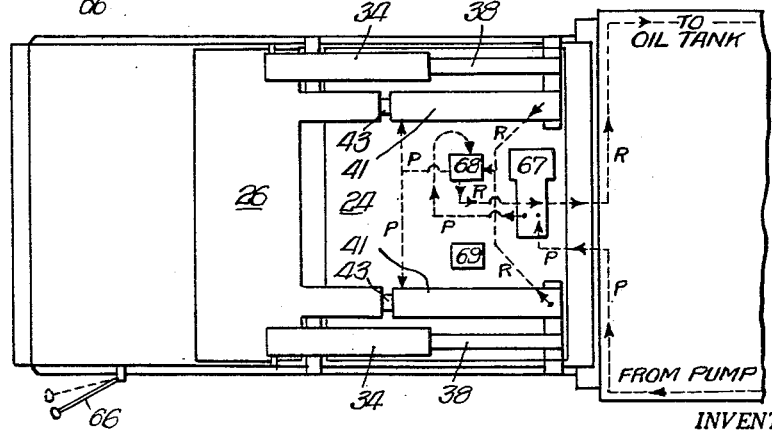

FIGS. 5 to 9, inclusive, are schematic views which show in sequence the several positions and movements of the carrier and packer plates during a loading cycle;

FIG. 10 is a fragmentary side view of the rear end of the tail gate portion showing in its raised or operative position the sill extension which is used when a separate container is connected up with the loading mechanism for raising and dumping such container;

FIG. 11 is a perspective view of the rear end of the vehicle, showing the sill extension raised into its operative position and the separate container connected up with the loading mechanism;

FIGS. 12 to 16, inclusive, are schematic views which show in sequence the several positions and movements of the container and the corresponding positions and movements of the carrier and packer plates during the raising, dumping and return of the container;

FIG. 17 shows the control lever for the carrier and packer plates and the path of movement which the free edge of the packer plate follows in going through a loading cycle;

FIG. 18 shows schematically the several positions which the control lever assumes to effectuate the path illustrated in FIG. 17; and FIGS. 19 to 23, inclusive, are views which show schematically in operating sequence one arrangement of hydraulic control valves which may be used to reciprocate the carrier plate back and forth and swing the packer plate up and down.

As will be observed in the drawings, the vehicle includes a large capacity storage body 10 and a receiving hopper 11 which is located at the rear end of the body 10 within a tail gate housing 12.

The rear end of the body 10 is open, and the housing 12 is hinged at its front upper edge to the rear upper edge of the body 10 at 13, whereby to permit the housing 12 to be swung upwardly and rearwardly into an out-of-the-way position to enable the contents of the body 10, after the body has been filled, to be discharged rearwardly upon the body being tilted downwardly and rearwardly by conventional mounting and operating means (not shown).

The rear end of the housing 12 is curved on an arc and is provided above the rear edge 14 of the hopper 11 with a rectangular opening 15 through which refuse is adapted to be dumped into the hopper. The rear edge 14 of the hopper forms the bottom sill of the opening 15. The opening 15 is adapted to be closed at times by a door 16, which door when not in use is movable upwardly and forwardly into an out-of-the-way position by suitable mechanism.

The bottom 17 of the hopper is curved on an arc which forms a continuation of the curvature of the rear end of the housing 12 and merges forwardly with the bottom 18 of a tangentially arranged upwardly and forwardly inclined passageway 19, which passageway communicates at its front upper end with the open rear end of the body 10.

Two confronting guideways 20 in the form of recessed tracks are provided in the side walls 21 of the housing 12. These guideways extend upwardly and forwardly at the same inclination as the bottom 18 of the passageway 19 and are located a substantial distance above the bottom 18. The lower ends 22 of the guideways 20 terminate at approximately the center of curvature of the bottom 17 of the hopper, while the upper ends 23 of the guideways terminate at approximately the front upper edge of the housing 12.

A substantially flat generally rectangular carrier plate 24 extends between the side walls 21 of the housing 12 and is disposed at substantially the same inclination as the guideways 20. The carrier plate 24 is equipped adjacent its corners with anti-friction rollers 25, which rollers interfit within the guideways 20 and support the carrier plate for forward and rearward reciprocatory movement in vertically spaced relation to the bottom 18 of the passageway 19. The carrier plate is spaced above the bottom 18 a distance which corresponds approximately to the radius of curvature of the bottom 17 of the hopper.

A substantially flat generally rectangular packer plate 26 also extends between the side walls 21 of the housing 12 and is hinged at its front end to the rear end of the carrier plate 24 at 27. The packer plate 26 extends rearwardly from the carrier plate 24 a distance which corresponds approximately to the radius of curvature of the bottom 17 of the hopper 11 and terminates in a small right angularly disposed clearing blade 28.

A stationary partition plate 29 extends between the side walls 21 of the housing 12 immediately beneath and parallel to the upper portions of the guideways 20, where it closes off the upper portion only of the open rear end of the body 10 when the housing 12 is lowered and sealed and latched in its lowered position against the rear end of the body. The partition plate 29, which is arranged at the same angle of inclination as the guideways 20, extends downwardly and rearwardly from the upper front edge of the housing 12 immediately in front of the carrier plate 24, where it serves to effectively shield the upper portion of the carrier plate as well as the upper portions of the guideways 20 from refuse compacted within the upper portion of the body 10. The lower edge 30 of the partition plate 29 is sealed with respect to the underside of the carrier plate 24 in all positions of the latter by a wiper blade 31, which blade is movably mounted on the lower edge 30 of the partition plate and is yieldingly pressed against the underside of the carrier plate by springs 32.

For reciprocating the carrier plate 24 back and forth between its foremost and rearmost positions two simultaneously acting hydraulic cylinder and piston assemblies, indicated generally at 33, are provided, one adjacent each side of the housing 12. The closed rear ends of the cylinders 34 of these assemblies are pivotally attached at 35 to brackets 36 which are carried by the side walls 21 of the housing within the ends of a channel-shaped cross brace 37, while the front ends of the pistons 38 which operate within the cylinders 34 are pivotally attached at 39 to the carrier plate 24 adjacent the side edges of the front end of the latter. When the pistons 38 are extended, as shown in FIGS. 3 and 4, the carrier plate 24 is moved forwardly into its foremost position, whereas when the pistons 38 are retracted the carrier plate is moved rearwardly into its rearmost position.

For swinging the packer plate 26 upwardly and downwardly about the rear end of the carrier plate 24 two other simultaneously acting hydraulic cylinder and piston assemblies, indicated generally at 40, are provided, in inwardly spaced relation to the cylinder and piston assemblies 33. The closed front ends of the cylinders 41 of the assemblies 40 are pivotally attached at 42 to the carrier plate 24 inwardly of the side edges of the front end of the latter, while the rear ends of the pistons 43 which operate within the cylinders 41 are pivotally attached at 44 to the front ends of two large triangular shaped extension brackets 45, which brackets are attached to the back of the packer plate 26 at points inwardly offset with respect to the side edges of that plate. When the pistons 43 are retracted, as shown in FIGS. 3 and 4, the packer plate 26 is swung upwardly into its raised position, whereas when the pistons 43 are extended the packer plate 26 is swung downwardly into its lowered position.

The sequence in which the carrier plate 24 and the packer plate 26 move during each loading cycle is illustrated schematically in FIGS. 5 to 9, inclusive.

In FIG. 5 the carrier plate 24 is shown in its foremost position and the packer plate 26 is shown in its lowered position. These are the positions of the plates when a loading cycle has been completed and the loading and packing mechanism has come to rest, with the packer plate 26 holding the refuse compacted within the body 10. While the plates are in these positions it is intended that refuse be dumped into the hopper 11 through the opening 15, either by hand or by the power lifting of separate containers, as later described.

To start the loading cycle the packer plate 26 is swung upwardly, as indicated by the arrow A, from the position shown in FIG. 5 into the raised position shown in FIG. 6, while the carrier plate 24 remains stationary in its foremost position.

After the packer plate 26 has reached the raised position shown in FIG. 6 it remains in its raised position while the carrier plate 24 moves rearwardly, as indicated by the direction arrow B, into its rearmost position, where the packing and loading mechanism preferably comes to rest, as shown in FIG. 7, with the packer plate 26 above the refuse which has been dumped into the hopper.

From the position shown in FIG. 7 the packer plate 26 is next swung downwardly, as indicated by the direction arrow C, into its lowered position at right angles to the carrier plate 24, as shown in FIG. 8, during which movement it sweeps the refuse in the hopper 11 before it upwardly and forwardly into the passageway 19.

After it has assumed the right angular position shown in FIG. 8 the packer plate 26 remains in that position while the carrier plate 24 travels forwardly again, as indicated by the direction arrow D, into its foremost position, shown in FIG. 9 (and also shown in FIG. 5), during which movement of the carrier plate 24 the packer plate 26 forces the refuse in front of it through the passageway 19 into the rear end of the body 10, compacting the refuse under great pressure against the refuse already in the body. This completes the loading cycle, with the plates 24 and 26 in position to start another loading cycle.

For the purpose of enabling a separate wheeled container 46, such as that shown in FIG. 11, to be raised and inverted by power to dump refuse previously deposited in the container into the hopper 11, a hopper extension plate 47, shown in FIGS 2 and 10, is provided at the rear end of the hopper, which plate is of the same general type as disclosed in Gollnick Patent No. 2,928,562.

The hopper extension plate 47 is pivotally attached to the rear end of the hopper 11 at 48, adjacent the lower edge 14 of the opening 15. When not being used the hopper extension plate 47 hangs freely downward in the depending position shown in FIG. 3, while when being used it is swung upwardly into the raised position shown in FIG. 10, where it is latched by suitable means in that position. The upper edge 49 of the plate 47 provides a sill which is substantially elevated above the rear edge 14 of the hopper.

In addition to the hopper extension plate 47 two arms 50 are provided adjacent the ends of the loading edge 14 of the hopper for detachable connection with the container 46. These arms 50 are connected to brackets 51 at the sides of the rear ends of the hopper by pivot pins 52, which pins pass through vertical slots 53 in the brackets. The free ends of the arms 50 are equipped with journaling notches 54 and slidingly overlappable sleeves 55. After the container 46 has been wheeled into the position shown in FIG. 11 the notches 54 on the arms 50 are fitted about laterally projecting trunnions 56 on the upper front corners of the container and are latched to the trunnions 56 by the sleeves 55. The vertical slots 53 in the brackets 51 allow for any initially non-parallel positioning of the container relative to the hopper due to irregularities in the supporting surface immediately beneath the container. Until the container 46 is ready to be coupled up with the hopper the arms 50 are permitted to hang freely down, as shown in FIG. 10.

After the container 46 has been wheeled into position, and either before or after the arms 50 have been coupled with the trunnions 56 on the ends of the container, two flexible cables 57 which are normally carried within the upper portion of the housing 12 are connected with the ends of the container at points spaced rearwardly from the trunnions 56 by means of fittings 58 on the ends of the cables which are apertured and latch over studs 59 on the ends of the container. The fittings 58 are preferably additionally provided on their ends with hook formations 60 for use in the event a container of a different size is employed.

The other ends of the cables 57 are permanently attached at 61 to the sides of the triangular shaped brackets 45 on the back of the packer plate 26, in substantially spaced relation to the pivotal axis of the plate 26, as shown in FIGS. 11 and 12, and before leading to the container 46 the cables are trained around pulleys 62 which are mounted on the back of carrier plate 24. Because of this doubled back cable and pulley arrangement the initial movement of the packer plate 26 starts to raise the container 46 rather slowly but under increased power from the initial position of the container shown in FIG. 12 into the raised and partially tilted position shown in FIG. 13.

In order to obtain progressive and uniform tilting of the container 46 while it is being raised by the forwardly pulling cables 57 from the starting position shown in FIG. 12 to the partially raised and tilted position shown in FIG. 13, the front wall of the container is maintained during such movement at a substantial angle to the connected arms 50 by means of a pair of strut-like links 63. The links 63 are adapted to project rearwardly from the arms 50 intermediate the ends of the latter, in inwardly offset relation to the arms, into abutment with the front wall of the container. The links are pivoted to the arms 50 at 64, and are provided with adjustable stops 65 for maintaining the links in positions substantially at right angles to the arms after the arms have commenced to swing into their more or less upright positions. Before the arms 50 have been raised and connected with the trunnions 56 on the container the links 63 may hang downwardly, as shown in FIG. 10, but as the arms 50 swing rearwardly and upwardly during the raising and tilting of the container the links 63 carried by the arms will assume rearwardly projecting positions with respect to the arms, substantially at right angles to the latter. They will then assist in supporting the container at points spaced rearwardly a substantial distance from the pivotal supports provided at the free ends of the arms 50. Since the rearwardly projecting ends of the links 63 in swinging upwardly remain in fixed relation to the arms 50 a progressive and uniform tilting of the container is assured about the pivotal connections 52 as soon as the ends of the links have engaged with the container and until the container has reached approximately the position shown in FIG. 13.

Any suitable hydraulic system, of which many are known, may be used to operate in the desired sequence the cylinder and piston assemblies 33 and 40 of the carrier and packer plates 24 and 26, also any suitable hand control means may be used to start and stop or, on occasion, reverse the movement of the plates. The present invention is not concerned with either the particular hydraulic system employed or the particular hand control means employed.

In FIG. 17 one form of hand control means, namely, a shiftable lever 66 is shown, and in FIG. 18 the several positions into which that lever moves in the operation of the plates are schematically illustrated. The lever 66 can move from its centered or neutral position, marked "N" in FIG. 18, into each of the positions marked 1, 2, 3 and 4 in that view.

When the lever 66 is in its neutral position "N" the loading mechanism is in the starting or finishing position shown in either FIG. 5 or FIG. 9.

In order to start the mechanism operating the operator shifts the lever 66 from its neutral position "N" into position 1. This causes the free edge of the packer plate 26 to swing upwardly in an arc along the dotted line shown in FIG. 17 to the point 1. As soon as the free edge of the packer plate 26 reaches the point 1 built-up pressure in the hydraulic system acting through suitable control valves automatically causes the carrrier plate 24 to travel rearwardly, with the free edge of the packer plate 26 following along the dotted line path from point 1 to point 2 on FIG. 17, and with the lever 66 at the same time automatically shifting from position 1 to position 2 on FIG. 18.

When the free edge of the packer plate 26 reaches the point 2 on FIG. 17 the hydraulic system is such that all movement stops. When the operator is ready to have the packer plate 26 swung downwardly from its raised rearmost position he shifts the lever 66 into position 3 on FIG. 18, whereupon the free edge of the packer plate 26 swings downwardly in an arc along the dotted line shown in FIG. 17 from the point 2 to the point 3. As soon as the free edge of the packer plate 26 reaches the point 3 the carrier plate 24 will be automatically actuated to travel forwardly, with the free edge of the packer plate 26 moving from the point 3 to the point 4 on FIG. 17, and with the lever 66 shifting automatically from position 3 into position 4 on FIG. 18. After the packing mechanism comes to rest in the position shown in FIG. 17, or in other words has returned to its starting position, the operator moves the lever 66 back into its centered or neutral position "N" on FIG. 18, in readiness for the next loading operation. The above described cycle of operation may be stopped by the operator at any point by moving the lever 66 into the neutral position "N," and movement of the plates may also be reversed by the operator at any time and for any reason by moving the lever 66 into any of the other positions shown on FIG. 18.

Suitable control valves 67, 68 and 69 for the hydraulic system are shown schematically in FIGS. 19 to 23, inclusive, performing their several functions in the hereinafter described sequence. In these views the paths of the oil under pressure and the paths of the return oil are shown in dotted lines, with arrows indicating in each instance the direction of flow.

The valves 67, 68 and 69 are of the well known shiftable spool type. The valve 67 constitutes the main or master valve and is connected by pressure and return lines with each of the other two valves 68 and 69. The valve 68 is connected with the closed and piston ends of the cylinders 41 for actuating the packer plate 26 to swing the latter either upwardly or downwardly, while the valve 69 is connected with the closed and piston ends of the cylinders 34 for actuating the carrier plate 24 to reciprocate the latter either forwardly or rearwardly.

When the lever 66 is moved from its neutral position "N" into position 1, as shown on FIG. 18, two things occur, namely, the spool in the master valve 67 is shifted from its neutral position into its "IN" position and at the same time the spools in the valves 68 and 69 are shifted from their neutral positions into their "IN" positions. As soon as this has occurred oil will flow under pressure through the master valve 67 into the valve 68 and from there into the piston rod ends of the packer plate cylinders 41, causing the packer plate 26 to be swung from its lowered position, shown in FIG. 19, into its raised position, shown in FIG. 20.

When the pistons 43 in the cylinders 41 have been fully retracted an immediate pressure build-up takes place in the system, which pressure causes the master valve 67 to shift from its "IN" position through its neutral position into its "OUT" position, thereby permitting oil to flow under pressure from the valve 67 into the valve 69 and from there into the piston rod ends of the carrier plate cylinders 34, causing the carrier plate 24 with the packer plate 26 maintained in its raised position, to travel rearwardly into its rearmost position as shown in FIG. 21.

When the pistons 38 in the cylinders 34 have been fully retracted a pressure build-up immediately takes place in the system, which pressure causes the master valve 67 to shift from its "OUT" position back into its neutral position, stopping all movement.

As the cylinder and piston assemblies 33 and 40 are of the differential type, in that they retract approximately twice as fast as they extend, it is desirable in the interest of safety to require movement of the loading and packing mechanism to be started again manually by the operator moving the lever 66 from position 2 on FIG. 18 into position 3 on that view. This movement causes two things to occur, namely, it shifts the master valve 67 from its neutral position into its "IN" position and at the same time shifts valve 68 from its "IN" position through its neutral position into its "OUT" position. As soon as this has occurred oil will flow under pressure through the valve 67 into the valve 68 and from there into the closed ends of the packer plate cylinders 41, causing the packer plate 26 to be swung from the raised position shown in FIG. 21 into the lowered position shown in FIG. 22.

When the pistons 43 in the cylinders 41 are fully extended an immediate pressure build-up in the system will automatically shift the master valve 67 from its "IN" position through its neutral position into its "OUT" position, whereupon oil under pressure will flow through the valve 67 into the valve 69 and from there into the closed ends of the carrier plate cylinders 34, and the carrier plate 24 will be moved forwardly, with the packer plate 26 maintained in its lowered position, from its rearmost position, shown in FIG. 22, into its foremost position, shown in FIG. 23. When the carrier plate 24 reaches its foremost position all movement stops.

When the pistons 38 in the cylinders 34 are fully extended an immediate pressure build-up in the system will automatically shift the master valve 67 from its "OUT" position back into its neutral position. The lever 66 may then be returned by the operator to its neutral position, causing the valves 68 and 69 to return to their neutral positions, in readiness for the next loading and packing cycle.

While the loading and packing mechanism of the vehicle is preferably automatic or semi-automatic in its operation, as described above, it may instead if desired be operated non-automatically, with each movement of each of the plates controlled manually.

The charging door 16 when closed may be raised manually and when raised it will be latched in its raised position. To release the door 16 for downward movement the latched engagement may be released by the operator by moving the door control lever 70, which lever is preferably located adjacent the loading and packing mechanism control lever 66.

I claim:

1. In a refuse vehicle, a storage body which is provided at its rear end with an opening, a receiving hopper at the rear end of the body, which hopper has an arcuately curved bottom, a passageway having a bottom which is arranged tangentially with respect to the curved bottom of the hopper and extends upwardly and forwardly at an inclination from the bottom of the hopper to the opening at the rear end of the body, guideways associated with the side walls of the hopper, which guideways extend upwardly and forwardly at substantially the same inclination as the bottom of the passageway and are spaced a substantial distance above the bottom of the passageway, a carrier plate which extends between the side walls of the hopper, which carrier plate is disposed at substantially the same inclination as the guideways at a distance above the bottom of the passageway corresponding approximately to the radius of curvature of the bottom of the hopper and is movably supported by the guideways for forward and rearward movement above the passageway, a packer plate which also extends between the side walls of the hopper, which packer plate is hinged at its front end to the rear end of the carrier plate and extends rearwardly from the carrier plate a distance corresponding approximately to the radius of curvature of the bottom of the hopper, means for moving the carrier plate forwardly and rearwardly, and means for turning the packer plate upwardly and downwardly relative to the rear end of the carrier plate.

2. In a refuse vehicle, a storage body which is provided at its rear end with an opening, a receiving hopper at the rear end of the body, which hopper has an arcuately curved bottom, a passageway having a bottom which is arranged tangentially with respect to the curved bottom of the hopper and extends upwardly and forwardly at an inclination from the bottom of the hopper to the opening at the rear end of the body, guideways associated with the side walls of the hopper, which guideways extend upwardly and forwardly at substantially the same inclination as the bottom of the passageway and are spaced above the bottom of the passageway a distance corresponding approximately to the radius of curvature of the bottom of the hopper, a carrier plate which extends between the side walls of the hopper, which carrier plate is disposed at substantially the same inclination as the guideways and is movably supported by the guideways for forward and rearward movement above the passageway, a packer plate which also extends between the side walls of the hopper, which packer plate is hinged at its front end to the rear end of the carrier plate and extends rearwardly from the carrier plate a distance corresponding approximately to the radius of curvature of the bottom of the hopper, means for moving the carrier plate forwardly and rearwardly, and means for turning the packer plate upwardly and downwardly relative to the rear end of the carrier plate.

3. In a refuse vehicle, a storage body which is provided at its rear end with an opening, a receiving hopper at the rear end of the body, which hopper has an arcuately curved bottom, a passageway having a bottom which is arranged tangentially with respect to the curved bottom of the hopper and extends upwardly and forwardly at an inclination from the bottom of the hopper to the opening at the rear end of the body, guideways associated with the side walls of the hopper, which guideways extend upwardly and forwardly at substantially the same inclination as the bottom of the passageway and are spaced above the bottom of the passageway a distance corresponding approximately to the radius of curvature of the bottom of the hopper, a carrier plate which extends between the side walls of the hopper, which carrier plate is disposed at substantially the same inclination as the guideways and is movably supported by the guideways for forward and rearward movement above the passageway, a packer plate which also extends between the side walls of the hopper, which packer plate is hinged at its front end to the rear end of the carrier plate and extends rearwardly from the carrier plate a distance corresponding approximately to the radius of curvature of the bottom of the hopper, means for moving the carrier plate forwardly from its rearmost position into its foremost position with the packer plate turned downwardly, whereby to move refuse in front of the packer plate through the passageway into the body, means for then turning the packer plate upwardly with the carrier plate maintained in its foremost position, means for then moving the carrier plate rearwardly from its foremost position into its rearmost position with the packer plate maintained in its upwardly turned position, whereby to cause the packer plate to pass rearwardly over refuse dumped into the hopper, means for then turning the packer plate downwardly through the hopper with the carrier plate maintained in its rearmost position, whereby to sweep refuse in the hopper forwardly toward the passageway, and means for then moving the carrier plate forwardly again from its rearmost position into its foremost position with the packer plate maintained in its downwardly turned position, whereby to again move refuse in front of the packer plate through the passageway into the body.

4. In a refuse vehicle, a storage body which is provided at its rear end with an opening, a receiving hopper at the rear end of the body, which hopper has an arcuately curved bottom, a passageway having a bottom which is arranged tangentially with respect to the curved bottom of the hopper and extends upwardly and forwardly at an inclination from the bottom of the hopper to the opening at the rear end of the body, guideways associated with the side walls of the hopper, which guideways extend upwardly and forwardly at substantially the same inclination as the bottom of the passageway and are spaced above the bottom of the passageway a distance corresponding approximately to the radius of curvature of the bottom of the hopper, a carrier plate which extends between the side walls of the hopper, which carrier plate is disposed at substantially the same inclination as the guideways and is movably supported by the guideways for forward and rearward movement above the passageway, a packer plate which also extends between the side walls of the hopper, which packer plate is hinged at its front end to the rear end of the carrier plate and extends rearwardly from the carrier plate a distance corresponding approximately to the radius of curvature of the bottom of the hopper, means for moving the carrier plate forwardly from its rearmost position into its foremost position with the packer plate turned downwardly at substantially right angles to the carrier plate, whereby to move refuse in front of the packer plate through the passageway into the body, means for then turning the packer plate upwardly at an inclination to the carrier plate with the carrier plate maintained in its foremost position, means for then moving the carrier plate rearwardly from its foremost position into its rearmost position with the packer plate maintained in its upwardly turned position, whereby to cause the packer plate to pass rearwardly over refuse dumped into the hopper, means for then turning the packer plate downwardly through the hopper into a position at substantially right angles to the carrier plate with the carrier plate maintained in its rearmost position, whereby to sweep refuse in the hopper forwardly toward the passageway, and means for then moving the carrier plate forwardly again from its rearmost position into its foremost position with the packer plate maintained in its downwardly turned position, whereby to again move refuse in front of the packer plate through the passageway into the body.

5. In a refuse vehicle, a storage body which is provided at its rear end with an opening, a receiving hopper at the rear end of the body, which hopper has an arcuately curved bottom, a passageway having a bottom which is arranged tangentially with respect to the curved bottom of the hopper and extends upwardly and forwardly at an inclination from the bottom of the hopper to the opening at the rear end of the body, guideways associated with the side walls of the hopper, which guideways extend upwardly and forwardly at substantially the same inclination as the bottom of the passageway and are spaced above the bottom of the passageway a distance corresponding approximately to the radius of curvature of the bottom of the hopper, a carrier plate which extends between the side walls of the hopper, which carrier plate is disposed at substantially the same inclination as the guideways and is movably supported by the guideways for forward and rearward movement above the passageway, a packer plate which also extends between the side walls of the hopper, which packer plate is hinged at its front end to the rear end of the carrier plate and extends rearwardly from the carrier plate a distance corresponding approximately to the radius of curvature of the bottom of the hopper, means for moving the carrier plate forwardly from its rearmost position into its foremost position with the packer plate turned downwardly at substantially right angles to the carrier plate, whereby to move refuse in front of the packer plate through the passageway into the body, means for then turning the packer plate upwardly at an inclination to the carrier plate with the carrier plate maintained in its foremost position, means for then moving the carrier plate rearwardly from its foremost position into its rearmost position with the packer plate maintained in its upwardly turned position, whereby to cause the packer plate to pass rearwardly over refuse dumped into the hopper, means for then turning the packer plate downwardly through the hopper into a position at substantially right angles to the carrier plate with the carrier plate maintained in its rearmost position, whereby to sweep refuse in the hopper forwardly toward the passageway, means for then moving the carrier plate forwardly again from its rearmost position into its foremost position with the packer plate maintained in its downwardly turned position, whereby to again move refuse in front of the packer plate through the passageway into the body, and a stationary partition plate which extends between the side walls of the upper portion of the hopper immediately in front of the carrier plate when the latter is in its foremost position, which partition plate is disposed at substantially the same inclination as the carrier plate and shields the upper portion of the latter and also the upper portions of the guideways for the same from refuse previously compacted in the body.

6. In a vehicle of the type having a storage body and a loading hopper behind and in communication with the body, the combination of a forwardly and rearwardly reciprocable carrier plate in the hopper, an upwardly and downwardly swingable packer plate in the hopper which is pivotally connected at its front edge to the rear edge of the carrier plate for movement both with and independently of the latter, means for reciprocating the carrier plate forwardly and rearwardly, and means for swinging the packer plate upwardly and downwardly.

7. In a vehicle of the type having a storage body and a loading hopper behind and in communication with the body, the combination of a forwardly and rearwardly reciprocable carrier plate in the hopper, an upwardly and downwardly swingable packer plate in the hopper which is pivotally connected at its front edge to the rear edge of the carrier plate for movement both with and independently of the latter, means for reciprocating the carrier plate forwardly and rearwardly, means for swinging the packer plate upwardly and downwardly, and one or more cables within the upper portion of the hopper for connection with a separate container, the rear ends of the cables being adapted to be detachably connected with the container for raising and tilting the same to discharge refuse therein into the hopper, the front ends of the cables being connected to the back of the packer plate in offset relation to the pivotal axis of the latter, and the intermediate portions of the cables being looped around pulleys which are journaled on the back of the carrier plate in forwardly spaced relation to the front ends of the cables.

8. In a vehicle of the type having a storage body, a loading hopper behind and in communication with the body, into which hopper a separate mobile container is adapted to be inverted and dumped upon being raised and tilted with respect to the hopper, and means adapted to be connected with the container for raising the same; the provision of a pair of laterally spaced brackets which are mounted on the hopper at the sides of the rear end of the latter, which brackets are provided with vertically extending slots, and a pair of laterally spaced arms which are pivotally but slidably connected with the brackets within the slots for free vertical movement therein, which arms are provided at their free ends with means for pivotally connecting the same with the container.

9. In a vehicle of the type having a storage body, a loading hopper behind and in communication with the body, into which hopper a separate mobile container is adapted to be inverted and dumped upon being raised and tilted with respect to the hopper, means adapted to be connected with the container for raising the same, and a pair of laterally spaced arms which are pivotally connected with the hopper at the sides of the rear end of the same for swinging movement from depending positions into upstanding positions, which arms are adapted to be pivotally connected at their free ends with the upper portion of the container; the provision of a pair of laterally spaced container engaging members, which members are carried by the arms intermediate the points of connection of the arms with the hopper and the points of connection of the arms with the container, and which members are adapted to project rearwardly into engagement with the upper portion of the container at points below the points of connection of the arms with the container as the arms approach their upstanding positions.

References Cited in the file of this patent

UNITED STATES PATENTS

| | | |
|---|---|---|
| 2,403,973 | George et al. | July 14, 1946 |
| 2,424,852 | Rush et al. | July 29, 1947 |
| 2,649,216 | Gollnick | Aug. 18, 1953 |
| 2,832,484 | Schneider | Apr. 29, 1958 |
| 2,877,910 | Nelson | Mar. 17, 1959 |
| 2,879,906 | Gwinn | Mar. 31, 1959 |
| 2,904,199 | Linde | Sept. 15, 1959 |
| 2,906,419 | Visco et al. | Sept. 29, 1959 |
| 2,928,562 | Gollnick | Mar. 15, 1960 |